(12) United States Patent
Xu et al.

(10) Patent No.: US 8,139,503 B2
(45) Date of Patent: Mar. 20, 2012

(54) SYSTEM AND METHOD FOR AUTOMATIC DETECTION OF UTRAN TOPOLOGY

(75) Inventors: Qiquan Xu, Coppell, TX (US); Kamat Ashwini, Plano, TX (US); Seshu Dommaraju, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 583 days.

(21) Appl. No.: 12/043,109

(22) Filed: Mar. 5, 2008

(65) Prior Publication Data

US 2008/0239986 A1 Oct. 2, 2008

Related U.S. Application Data

(60) Provisional application No. 60/909,287, filed on Mar. 30, 2007.

(51) Int. Cl.
*H04L 12/28* (2006.01)
*G06F 15/173* (2006.01)
(52) U.S. Cl. .......... 370/254; 709/223; 709/224
(58) Field of Classification Search .......... 370/254; 709/223, 224
See application file for complete search history.

(56) References Cited

U.S. PATENT DOCUMENTS

| | | | |
|---|---|---|---|
| 2004/0240456 A1* | 12/2004 | Picha | 370/401 |
| 2005/0240797 A1* | 10/2005 | Orava et al. | 714/4 |
| 2006/0109800 A1* | 5/2006 | Vaillant et al. | 370/254 |
| 2006/0252430 A1* | 11/2006 | Barreto et al. | 455/450 |
| 2008/0028286 A1* | 1/2008 | Chick | 715/208 |
| 2008/0102811 A1* | 5/2008 | Amirjoo et al. | 455/424 |

FOREIGN PATENT DOCUMENTS

| | | |
|---|---|---|
| EP | 0738091 A1 | 10/1996 |
| EP | 0848567 A1 | 6/1998 |
| WO | 01/97466 A1 | 12/2001 |

OTHER PUBLICATIONS

European Patent Office, "Search Report," issued in EPO Application No. 08153360.6, Dec. 6, 2010, 5 pages.

* cited by examiner

*Primary Examiner* — Ayaz Sheikh
*Assistant Examiner* — Tarell Hampton
(74) *Attorney, Agent, or Firm* — Michael J. Fogarty, III

(57) ABSTRACT

System and method for automatically detecting nodes, components and interfaces in a network. A preferred embodiment comprises detecting nodes in a network, wherein the nodes are coupled to a network controller, comprises identifying ports for the network controller, capturing messages received by the network controller at the ports, parsing the messages to identify a node address parameter, wherein the node address parameter uniquely identifies the node to the network controller, and if the node address parameter has not been previously identified, adding a new entry to a node database.

13 Claims, 3 Drawing Sheets

SYSTEM AND METHOD FOR AUTOMATIC DETECTION OF UTRAN TOPOLOGY

This application claims the benefit of U.S. Provisional Application No. 60/909,287, filed on Mar. 30, 2007, entitled System and Method for Automatic Detection of UTRAN Topology, which application is hereby incorporated herein by reference.

TECHNICAL FIELD

The present invention relates generally to a system and method for identifying elements of a network and, more particularly, to a system and method for automatically detecting and plotting Node Bs attached to a Radio Network Controller (RNC) in a UTRAN network.

BACKGROUND

The Universal Mobile Telecommunications System (UMTS) is a third-generation (3G) mobile phone technology standardized first by the European Telecommunications Standards Institute (ETSI) and now by the 3rd Generation Partnership Project (3GPP). UMTS carries both circuit switched (CS) and packet switched (PS) traffic using Wideband Code Division Multiple Access (W-CDMA) as its air interface. The description of the network components and protocols used in UMTS are well known to those of ordinary skill in the art and are available to the public from 3GPP, ETSI, and other sources. The UMTS network architecture consists of three domains: Core Network (CN), UMTS Terrestrial Radio Access Network (UTRAN), and User Equipment (UE).

The Core Network provides switching and routing for user traffic and provides network management functions. The Core Network architecture is based on the GSM network with GPRS. The UTRAN provides the air interface access to subscribers' UE. Base stations in the UTRAN are referred as Node-Bs, and the control equipment for the Node-Bs is called a Radio Network Controller (RNC). The UMTS User Equipment communicates via the WCDMA air interface to the Node-Bs. The UE may be attached to either the PS domain or CS domain or both. The UE is capable of simultaneously using PS services and CS services.

UMTS defines several interfaces and protocols for exchanging data between network components to set up voice and data calls to the UE. Each call comprises numerous messages that pass across various interfaces. In order to fully analyze a call, all of the messages for the call must be collected and correlated. One disadvantage of the prior art is that there can be numerous nodes in a UMTS network and that each of these network nodes must be known in order to accurately monitor the network.

A second disadvantage of the prior art is that the network nodes are continually changing as components, such as Node Bs, are added, moved, upgraded, serviced or deleted. Accordingly, the service provider must manually update a network configuration map each time such a change takes place.

SUMMARY OF THE INVENTION

These and other problems are generally solved or circumvented, and technical advantages are generally achieved, by embodiments of the present invention in which monitoring equipment captures messages at a network node and identifies new network components from address parameters in the captured messages. The network components are then displayed on a network map to a user.

In accordance with an embodiment of the present invention, a method for detecting nodes in a network, wherein the nodes are coupled to a network controller, comprises identifying ports for the network controller, capturing messages received by the network controller at the ports, parsing the messages to identify a node address parameter, wherein the node address parameter uniquely identifies a node to the network controller, and if the node address parameter has not been previously identified, adding a new entry to a node database. The entry to the node database includes the node address parameter and logical channel information. The node may be a UMTS Node B and the network controller may be a UMTS Radio Network Controller (RNC). The node address parameter may be a Transport Layer Address (TLA) associated with a UMTS Node B. The TLA is carried by a message selected from the group consisting of: Radio Link Setup Response, Radio Link Reconfiguration Preparation, and Radio Link Reconfiguration Commit messages.

In one embodiment, the messages are captured by monitoring equipment that is coupled to a UMTS Radio Network Controller (RNC). A new entry is added to a node database by a central monitoring server coupled to the monitoring equipment. The captured messages may be sent from the monitoring equipment to the central monitoring server as a Simple Network Management Protocol (SNMP) trap, for example. A multithread process is used to receive and queue the SNMP trap in a first thread of the multithread process and to process the SNMP traps in a second thread of the multithread process. A new UMTS Iub interface is associated with each new Node B that is detected.

In accordance with another embodiment of the present invention, a method for positioning network nodes on a display, comprises determining a display position for a central node, calculating a maximum radius, wherein the maximum radius corresponds to a distance between the central node and a farthest point on the display, calculating a first radius, wherein the first radius corresponds to the maximum radius modified by a first scale factor, and positioning one or more network nodes on a first circular region of the display, wherein the first circular region corresponds to a circle positioned at the first radius from the central node. Positioning the network nodes includes selecting locations for a first group of the network nodes on the first circular region, wherein the first group of the network nodes are separated by a first angular interval. Locations for a second group of the network nodes are selected on the first circular region, wherein the second group of the network nodes are separated by a second angular interval. A maximum number of network nodes that can be displayed on the first circular region is determined. When the maximum number of network nodes are positioned on the first circular region, a remaining group of network nodes are positioned on a second circular region of the display, wherein the second circular region corresponds to a circle positioned at a second radius from the central node. The second radius corresponds to the first radius modified by a second scale factor. In one embodiment, the central node, the network nodes, and an interface connection drawn between each of the network nodes and the central node are displayed to the user on the network map.

The present invention automatically detects nodes, interfaces and components of a large network. The present invention also provides the capability to display network components to a user.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
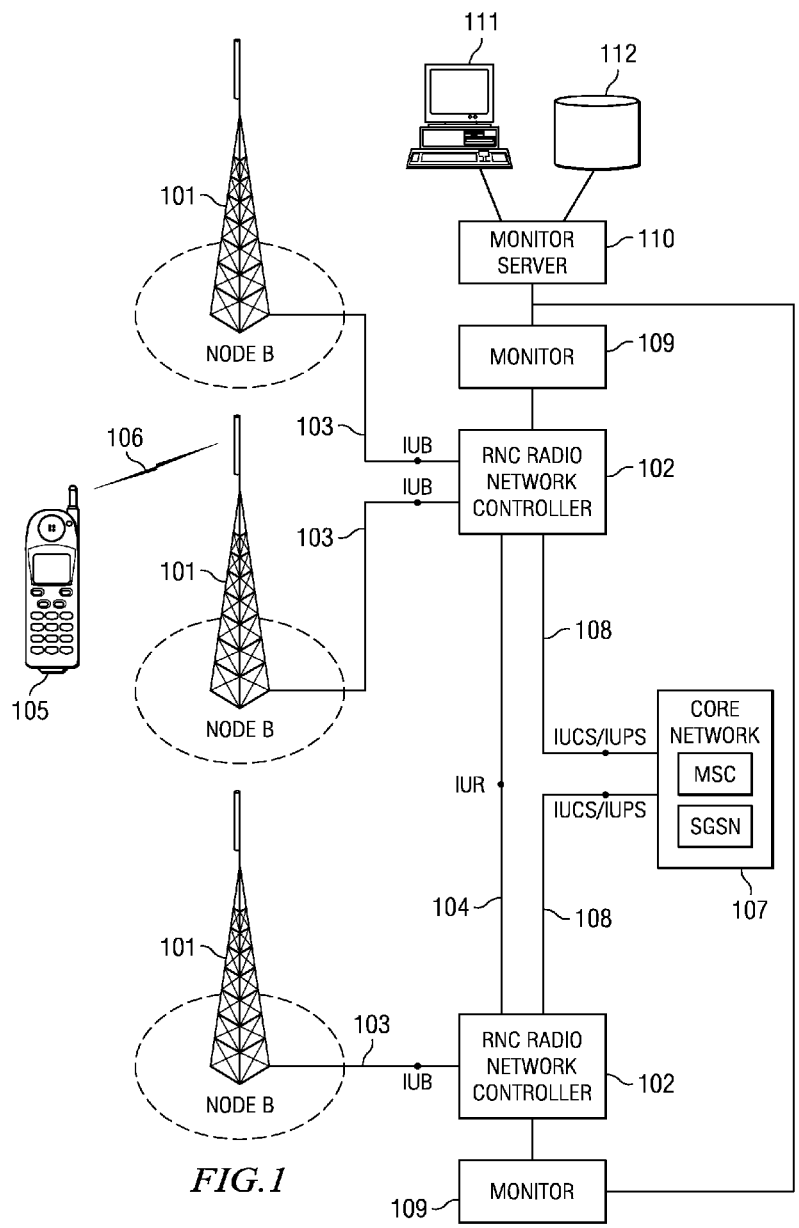
FIG. 1 is a high-level block diagram of components of a monitoring system for a UMTS network according to embodiments of the invention.

FIG. 1 illustrates a portion of a UMTS network comprising Node Bs 101 and Radio Network Controllers (RNCs) 102. Node Bs 101 communicate with RNCs 102 via Iub interfaces 103. RNCs 102 communicate with each other via Iur interface 104. Node B 101 is in communication with User Equipment (UE) 105 via air interface Uu 106. Whenever UEs 105 make or receive a call, signaling messages are exchanged between Node Bs 101 and RNCs 102 over Iub interfaces 103 and between RNCs 102 over Iur interface 104. Collectively, RNCs 102 and Node Bs 101 make up the UTRAN portion of the UMTS network. Mobile Switching Center (MSC)/Serving GPRS Support Node (SGSN) 107 represent the Core Network in UMTS. IuCS/IuPS interface 108 represents the interfaces for circuit-switched and packet-switched traffic routed between Core Network 107 and RNC 102.

Monitors or probes 109 are non-intrusively coupled to RNCs 102 to capture substantially all of the protocol messages traveling to and from RNCs 102. Monitoring equipment 109 identifies the messages belonging to each voice or data call and correlates those messages into one record per call. Monitors 109 are coupled to central server 110 and to workstation 111, which allows an operator to access network information collected by monitors 109.

The monitoring equipment, including monitors 109 and server 110, needs to know the configuration of the UMTS network in order to properly correlate and display network information to users at workstation 111. The UTRAN network may be very large. As many as two hundred Node Bs can be handled by a single RNC. The UTRAN configuration changes as Node Bs are added, moved, upgraded, serviced, or deleted. It can be challenging for a service provider to manually enter and update the UTRAN network configuration into the monitoring equipment in a timely manner. To ensure that the monitoring equipment is aware of the Node Bs 101 that are connected to the UTRAN, server 110 runs an auto-detection application for the UTRAN network to detect Node Bs and related Iub/Iur Interfaces along with the logical links associated with them. The user only needs to identify an RNC 102 along with its port information. The end result of the auto-detection application is the detection of the entire UTRAN network, which may be displayed on a network map and/or stored in database 112 at server 111.

For each physical device, the user configures the auto-detection algorithm by providing the type of device, TX port, RX port, and monitoring equipment. The user configures a RNC on the network map by providing the following information: monitoring equipment, list of physical devices, vendor information, release version information, decode tree used for parsing, and other display related information.

A monitor will auto-detect Node Bs 100 using the traffic observed at the ports specified for an RNC. A Transport Layer Address (TLA) uniquely identifies each Node B. The UTRAN messages that contain a TLA are the Radio Link Setup Response, Radio Link Reconfiguration Preparation, and Radio Link Reconfiguration Commit messages. The TLA, which is unique per RNC, along with its logical channel information is used to keep track of detected Node Bs and the interface links associated with each Node B. Whenever a unique TLA is discovered in the network, monitor 109 will send this information back to server 110 in the form of a Simple Network Management Protocol (SNMP) trap.

An auto-detection process running on server 110 will receive this SNMP trap and queue it. Due to the high rate of traps expected from monitors 109 when the UTRAN network is first being detected the server process is multi-threaded, in one embodiment, with one thread receiving and queuing the traps and the other thread processing the traps. This processing includes creating the elements hierarchically in database 112 according to the information in the trap. In one embodiment, a Node B entry is created first, then a corresponding Iub interface, link group, and logical link are created. In auto-detect mode, the data from monitor 109 is always considered to be most accurate and, therefore, the server database will be overwritten by the information from the monitor. Once database 112 has the required information, a map spotter algorithm is used to draw the Node Bs and the Iub interfaces on a network map. The cells associated with each Node B, though not visible on the network map directly, are stored database 112 and can be displayed on demand.

A process on server 110 downloads the unique identifiers of all the auto-detected elements to monitor 109, which will be used for further processing. The server detects duplicate SNMP traps for the same Node B by comparing the TLA information stored in database 112. These duplicate traps will not be processed, but the trap information may be logged for debugging.

Iur interfaces between RNCs may be detected using a similar algorithm. Each RNC has a unique identifier such as the RNC Id and/or the Pointcode. The identifier for Iur links is the identifier for the Remote RNC. The Iub and Iur interfaces as well as the channel information for the logical links may also be displayed on the network map.

Using the RNC data entered by the user and the Node B, Iub interface, and Iur interface data gathered by the auto-detection application, the monitoring system can display a network map to the user. The network map may be, for example, a graphical user interface (GUI) that illustrates an RNC and the associated interfaces and Node Bs. The GUI network map provides the user with a visual representation of the UTRAN and allows the user to access detailed configuration or operational status information about network elements.

Because there may be two hundred or more Node Bs associated with a single RNC, a map spotter application is used to select where the Node Bs should be placed on the network map. The map spotter application finds spare space on the network map so that the display is usable and organized and has minimal clutter. The map spotter application places a Node B or RNC node on the network map after the auto-detection application finds a new Iub or Iur interface. The following example uses Node Bs as an example to demonstrate the basic algorithm of the map spotter application.

Figure 2:
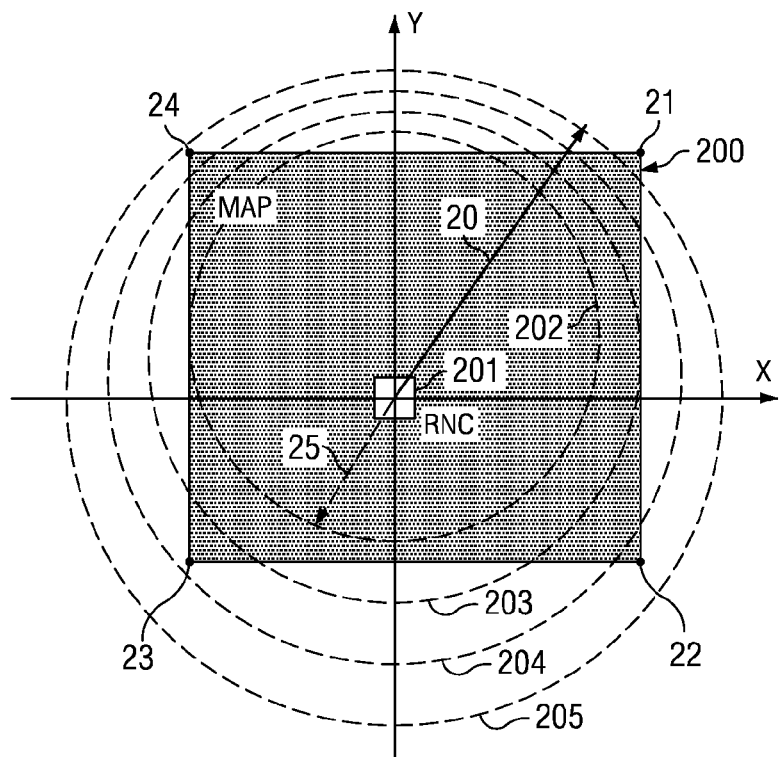
FIG. 2 is a diagram of a method for displaying a map of network nodes according to one embodiment of the invention.

Referring now to FIG. 2, area 200 is the area of the network map that will be displayed, for example, on workstation 111.

The initial inputs to the map spotter application are the map size and the position for RNC 201. Other parameters, such as a map name, may also be provided or required. It will be understood that RNC 201 can be positioned anywhere on display area 200 including the center of the area or any off-center position.

Once the map size and the location of RNC node 201 has been established, the map spotter application must place the Node Bs on display area 200. The Node Bs may be placed anywhere on map 200, but to improve the final layout the Node Bs will be positioned on circles, such as circles 202-205, that are centered around RNC 201. The Node Bs will be placed on the circles.

The map spotter application must determine where to position the circles on drawing area 200. First the map spotter application will determine a maximum radius of circles 202 by calculating the distances between RNC 201 and the four corners 21-24 of map 200. The longest distance 20 (i.e. from RNC 201 to the farthest corner 21) is the maximum radius of possible drawing circles. For example, circle 205 having a radius 20 (from RNC 201 to corner 21) will intersect drawing area 200 only at corner 21. Therefore, any Node Bs plotted on a circle with a radius greater than radius 20 of circle 25 will not appear on map display area 200.

The map spotter application selects an inner circle 202 with a radius less than radius 20 on which to begin placing the Node Bs for display. The radius 25 of innermost circle 202 is configurable and, in one embodiment, is measured in terms of percentage of maximum radius 20. For example, radius 25 will typically be set as 20% to 80% of the length of radius 20, and a default value of 40% may be used.

If needed, additional circles 203 and 204 may be used to position Node Bs on display area 200. In one embodiment, the distance between adjacent circles is constant and configurable based on display capabilities of workstation 111. For example, the distance between adjacent circles 202 and 203 may be adjusted between 20 to 100 pixels and 40 pixels may be used as a default setting. Once the locations of circles 202-204 are established, the map spotter application will place the Node Bs on the circles.

Figure 3:
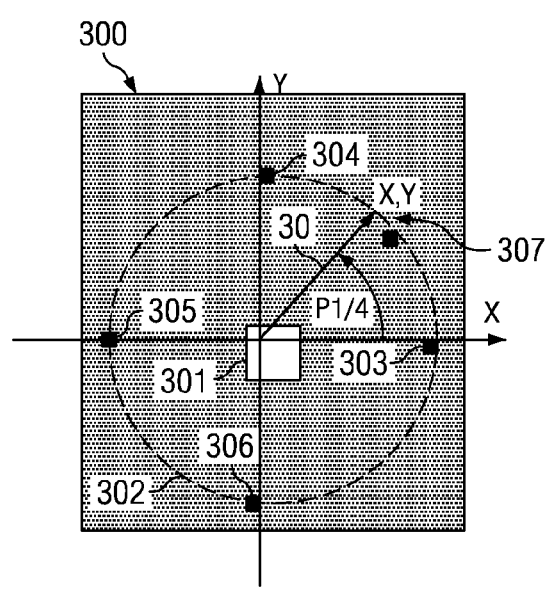
FIG. 3 is a diagram of a method for placing network nodes on a display map according to one embodiment of the invention.

Referring to FIG. 3, inner circle 302 is positioned in map display area 300 around RNC 301. The map spotter application determines where to position the Node Bs by dividing circle 302 into equal parts. Since radius 30 is fixed for circle 302, the positions where the Node Bs will be placed are identified either using x-y coordinates (x, y) or polar coordinates (radius, angle). The first Node B 303 is plotted, using polar coordinates, at (radius, 0), where "radius" is the radius 30 of circle 302. For the first round of plotting Node Bs on the circle, the map spotter application uses Pi/2 radian (i.e. 90 degrees) as the first interval or step between nodes. The second Node B 304 is drawn at (radius, Pi/2). Similarly, the third and fourth Node Bs 305 and 306, are drawn at (radius, Pi) and (radius, 3Pi/2), respectively.

These coordinates can be plotted as (radius, angle+ (n*step)), where "radius" is the radius of circle 302, "angle" is the initial angle of point 303, and "step" is the interval between points. In the example above, "angle" is equal to zero and "step" is Pi/2 radian. The points can also be plotted as x-y coordinates, wherein the first point 303 is:

$x = radius*cos(angle); y = radius*sin(angle)$.

The second node 304 is be drawn at:

$x = radius*cos(angle+step); y = radius*sin(angle+step)$.

The third node 305 is be drawn at:

$x = radius*cos(angle+2*step); y = radius*sin(angle+2*step)$.

Nodes are placed on the remainder of circle 302 in a similar manner.

When the value of (angle+step) equals or exceeds 2Pi radians (or 360 degrees), then the value of "step" is reset it to the half of the previous value. For example, in the first round described above, "step" was Pi/2 radian or 90 degrees. In the second round, "step" will be Pi/4 or 45 degrees, and "angle" will have the same value as "step." Accordingly, the first node (307) in the second round of placing Node Bs will be at:

$x = radius*cos(angle) = radius*cos(Pi/4)$;

$y = radius*sin(angle) = radius*sin(Pi/4)$.

The next interval would be at:

$x = radius*cos(angle+step) = radius*cos(Pi/4+Pi/4)$;

$y = radius*sin(angle+step) = radius*sin(Pi/4+Pi/4)$, which was already used in the first round as point 304, so that point is skipped in the second round. The remaining unused locations on circle 302 are placed in a similar manner until "angle+step" is greater than 2Pi radian or 360 degrees.

A third and subsequent round of nodes may be placed on circle 302 using the same technique as described above and by reducing the angle and step by half with each round. As noted above, the map spotter application skips any position that has was used in a previous round. The map spotter application will stop placing Node Bs on circle 302 when it becomes too crowded. The map spotter application may determine that a circle is too crowded, for example, when icons representing Node Bs on map 300 would be placed on top of existing icons.

When one circle is full and has no more room for Node Bs, the map spotter application will move to the next circle and begin the same process of plotting nodes on that circle. The process will continue until all the circles that can be displayed on map area 300 have been filled. If the last available circle is used up and the map spotter application still has nodes to draw, the application may continue drawing another round of nodes on each circle until all Node Bs are plotted without regard to how close the icons are placed.

Referring back to FIG. 2, it will be understood that not all positions on the circles are usable. Some areas on the circles, such as on circles 203 and 204, fall outside the map display area 200 and, therefore, will not be used. If the map spotter application determines that a point (x, y) falls outside of map area 200, then that point will be skipped and the next point on the circle will be evaluated.

Figure 4:
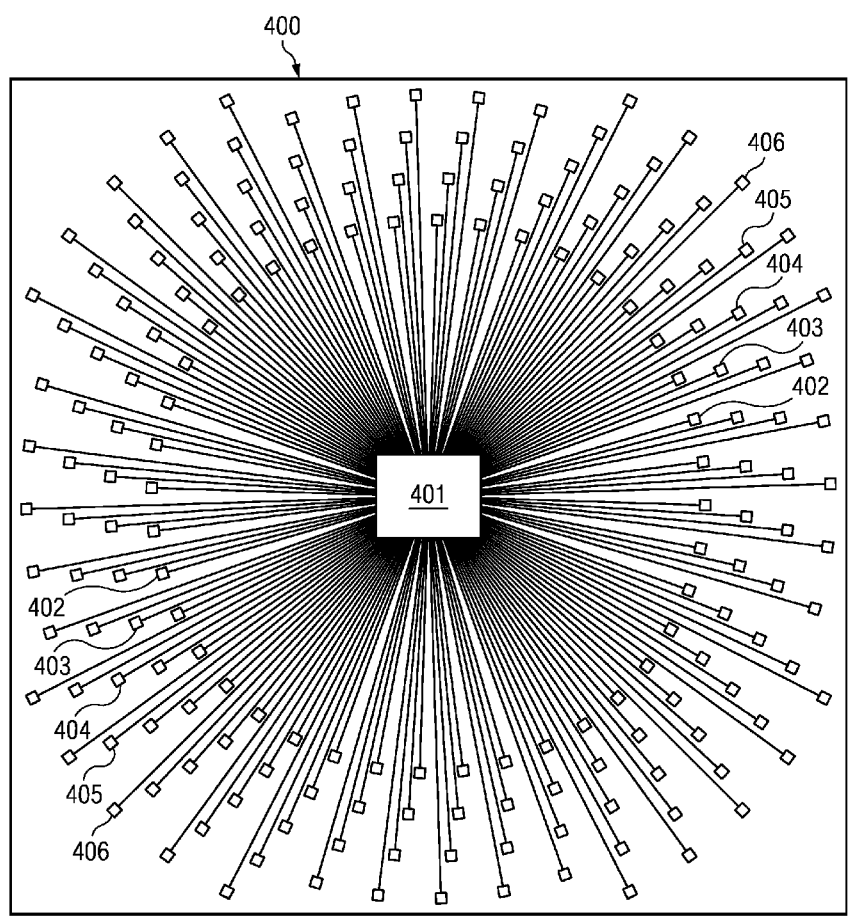
FIG. 4 illustrates a mapping of network nodes according to one embodiment of the invention.

FIG. 4 illustrates map 400 in which two-hundred Node Bs have been plotted around RNC 401. The two innermost circles, 402 and 403, have been completely filled with Node Bs. However, circles 404-406 do not entirely fit within the area of map 400 and, therefore, some areas on those circles have not been used. It will be understood that, in addition to Node Bs, any other network component, such as an RNC, MSC, SGSN, or UE, may be added to map 400 using the process described herein for display to a user.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    capturing messages received by a network controller via monitoring equipment coupled to a Universal Mobile Telecommunications System (UMTS) Radio Network Controller (RNC);
    sending a given one of the captured messages from the monitoring equipment to a central monitoring server as a Simple Network Management Protocol (SNMP) trap, wherein the central monitoring server is configured to:
        receive and queue the SNMP trap using a first thread of a multithread process; and
        process the SNMP trap using a second thread of the multithread process, the processing including parsing the SNMP trap to identify a node address parameter, wherein the node address parameter uniquely identifies a node to the network controller, and adding a new entry to a node database if the node address parameter has not been previously identified.

2. The method of claim 1, wherein the new entry to the node database includes the node address parameter and logical channel information.

3. The method of claim 1, wherein the node is a UMTS Node B and the network controller is a UMTS Radio Network Controller (RNC).

4. The method of claim 1, wherein the node address parameter is a Transport Layer Address (TLA) associated with a UMTS Node B.

5. The method of claim 4, wherein the TLA is carried by a message selected from the group consisting of: Radio Link Setup Response, Radio Link Reconfiguration Preparation, and Radio Link Reconfiguration Commit messages.

6. The method of claim 3, wherein the central monitoring server is further configured to associate an indication of a new UMTS Iub interface with an indication of a new Node B.

7. A method comprising:
    receiving, at a central monitoring server, a message captured via monitoring equipment coupled to at a radio network controller (RNC) of a Universal Mobile Telecommunication System (UMTS), wherein the captured message is transmitted to the central monitoring server as a Simple Network Management Protocol (SNMP) trap;
    queuing the SNMP trap using a first thread of a multithread process;
    determining, using a second thread of the multithread process, if a base station identified in the SNMP trap is a known network component based, at least in part, upon an address parameter; and
    if the base station is not a known network component, adding an indication of the base station and an indication of an associated base station interface to a list of network components.

8. The method of claim 7, wherein the base station is a UMTS node B and the address parameter is a transport layer address (TLA).

9. The method of claim 7, wherein the associated base station interface is a Iub interface.

10. The method of claim 7, further comprising: associating a link group and a logical link to the base station.

11. The method of claim 7, further comprising:
    receiving, at the central monitoring server, a second message as a second SNMP trap;
    queuing the second SNMP trap;
    determining if a second radio network controller identified in the second SNMP trap is a known network component; and
    if the second radio network controller is not a known network component, adding an indication of the second radio network controller and an indication of an associated radio network controller interface to the list of network components.

12. The method of claim 11, wherein the indication of the second radio network controller is a radio network controller identifier (RNC Id) or a pointcode.

13. The method of claim 11, wherein the associated radio network controller interface is an Iur interface.

* * * * *